(12) United States Patent
Horiguchi et al.

(10) Patent No.: US 8,919,869 B2
(45) Date of Patent: Dec. 30, 2014

(54) VEHICLE REAR BODY STRUCTURE

(75) Inventors: Jun Horiguchi, Wako (JP); Chikashi Nagashima, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 292 days.

(21) Appl. No.: 13/410,718

(22) Filed: Mar. 2, 2012

(65) Prior Publication Data

US 2012/0223547 A1    Sep. 6, 2012

(30) Foreign Application Priority Data

Mar. 4, 2011 (JP) ................................. 2011-048372

(51) Int. Cl.
  *B62D 25/02* (2006.01)
  *B62D 25/08* (2006.01)

(52) U.S. Cl.
  CPC ............. *B62D 25/087* (2013.01); *B62D 25/02* (2013.01)
  USPC .................. 296/203.04; 296/193.08; 296/198

(58) Field of Classification Search
  CPC ........ B62D 25/02; B62D 25/08; B62D 25/16; B62D 25/20; B62D 25/2009; B62D 25/2027; B62D 25/2036; B62D 25/2081
  USPC .................. 296/193.05, 193.08, 198, 203.01, 296/203.04
  See application file for complete search history.

(56) References Cited

U.S. PATENT DOCUMENTS

| | | | | |
|---|---|---|---|---|
| 1,854,714 | A * | 4/1932 | Northup | 296/193.08 |
| 4,973,103 | A * | 11/1990 | Imajyo et al. | 296/203.04 |
| 5,997,068 | A * | 12/1999 | Matsushita | 296/63 |
| 6,547,318 | B2 * | 4/2003 | Takeuchi | 296/204 |
| 6,648,401 | B2 * | 11/2003 | Behnke et al. | 296/198 |
| 6,672,653 | B2 * | 1/2004 | Nishikawa et al. | 296/203.04 |
| 6,824,200 | B2 | 11/2004 | Tomita | |
| 6,846,037 | B2 * | 1/2005 | Engels et al. | 296/193.04 |
| 6,886,885 | B2 * | 5/2005 | White et al. | 296/193.08 |
| 6,926,350 | B2 * | 8/2005 | Gabbianelli et al. | 296/203.01 |

(Continued)

FOREIGN PATENT DOCUMENTS

| | | | | |
|---|---|---|---|---|
| CN | | 1511098 A | 7/2004 | |
| DE | | 19956430 A1 * | 5/2001 | ............. B62D 25/02 |

(Continued)

OTHER PUBLICATIONS

Chinese Office Action dated Jan. 30, 2014, issued in corresponding Chinese application No. 201210024696.2 (6 pages).
Japanese Office Action dated Jan. 30, 2013, issued in corresponding Japanese application No. JP2011-048372 (4 pages).

*Primary Examiner* — Glenn Dayoan
*Assistant Examiner* — Paul Chenevert
(74) *Attorney, Agent, or Firm* — Westerman, Hattori, Daniels & Adrian, LLP

(57) ABSTRACT

A vehicle rear body structure includes rear floor panels, rear wheel housings, and rear side extensions. The rear side extensions each have a first joined portion that is joined to a breadthways outer end of each of the rear floor panels, a second joined portion that is joined to an rear end of each of the rear wheel housings, a side portion that is an uprising slanted portion extending from the rear end of the first joined portion to the second joined portion, a surface portion surrounded by the first joined portion, the second joined portion, and the side portion, and an extending portion joined to a flange portion of a rear pillar, wherein the side portion is configured to have higher stiffness or strength than at least the surface portion.

9 Claims, 7 Drawing Sheets

(56) References Cited

U.S. PATENT DOCUMENTS

| | | | |
|---|---|---|---|
| 7,364,225 B2* | 4/2008 | Tomioka | 296/203.04 |
| 7,472,948 B2* | 1/2009 | Yatabe et al. | 296/203.04 |
| 7,520,560 B2* | 4/2009 | Frank et al. | 296/193.05 |
| 7,614,687 B2* | 11/2009 | Nakamura et al. | 296/193.06 |
| 8,141,937 B2* | 3/2012 | Tsuyuzaki et al. | 296/187.12 |
| 2013/0241240 A1* | 9/2013 | Tokumoto et al. | 296/193.08 |
| 2013/0341970 A1* | 12/2013 | Shimizu et al. | 296/193.08 |

FOREIGN PATENT DOCUMENTS

| | | | | |
|---|---|---|---|---|
| FR | 2934230 A1 * | 1/2010 | | B62D 25/20 |
| FR | 2941670 A1 * | 8/2010 | | B62D 25/02 |
| JP | 63-242784 A | 10/1988 | | |
| JP | 2002-29453 A | 1/2002 | | |
| JP | 2002-029453 A | 1/2002 | | |
| JP | 2007-062679 A | 3/2007 | | |

\* cited by examiner

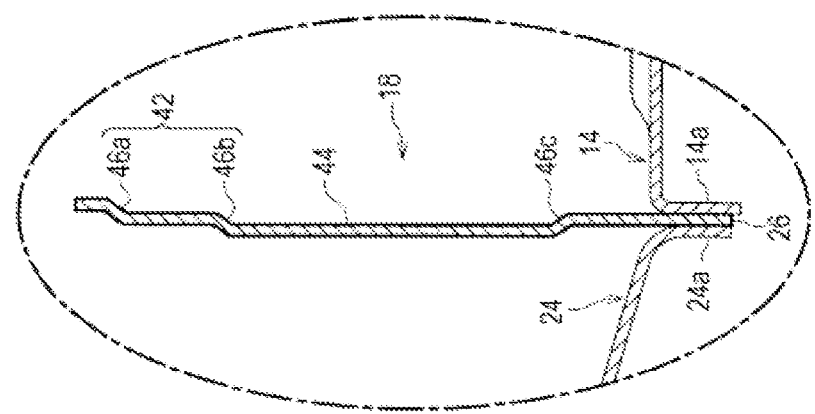
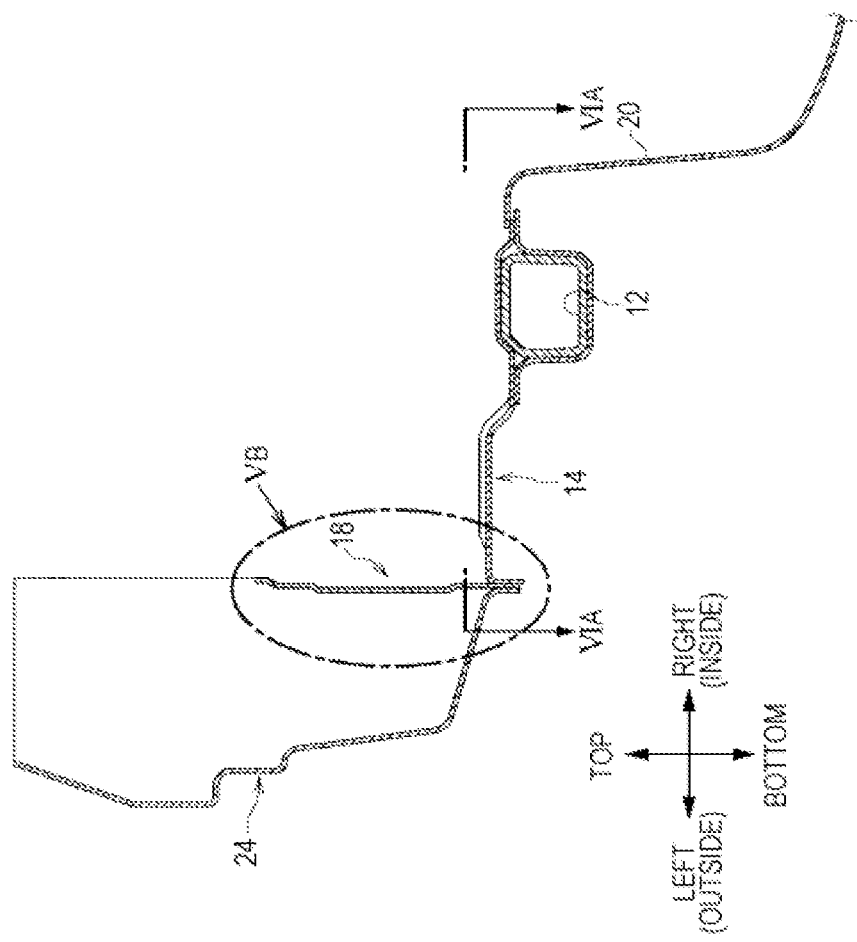
FIG. 5B
FIG. 5A

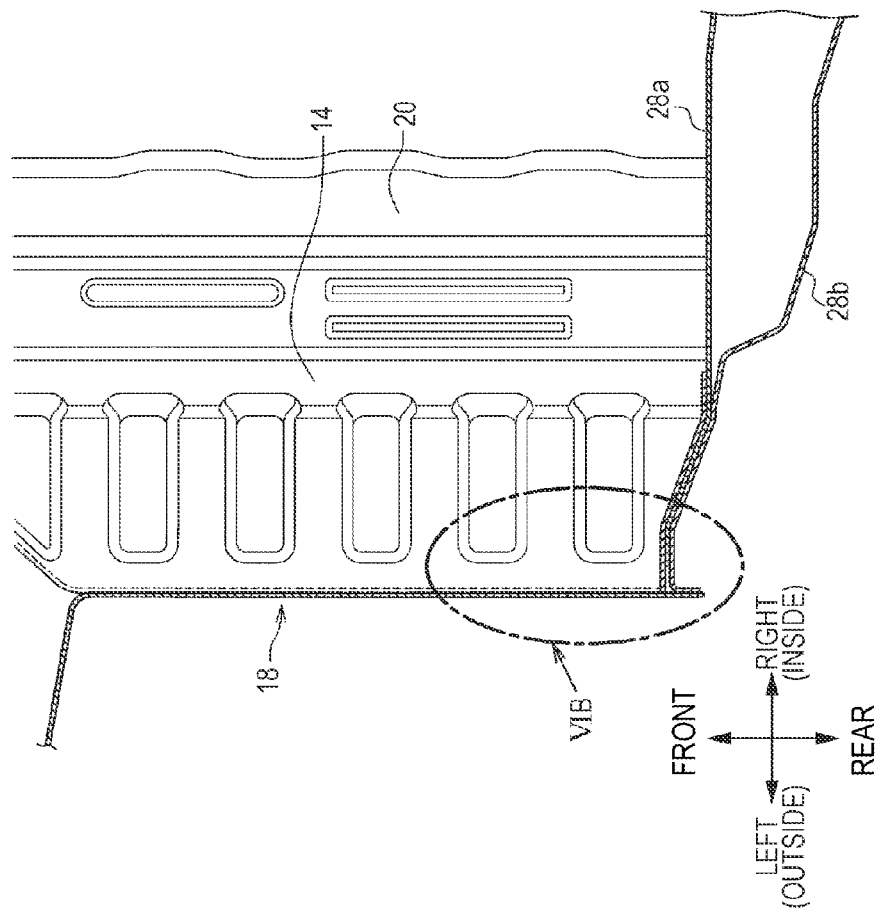

VEHICLE REAR BODY STRUCTURE

CROSS REFERENCES TO RELATED APPLICATIONS

The present application claims priority under 35 U.S.C. §119 to Japanese Patent Application No. 2011-048372, filed Mar. 4, 2011, entitled "Vehicle Rear Body Structure". The contents of this application are incorporated herein by reference to their entirety.

TECHNICAL FIELD

The present embodiment relates to a vehicle rear body structure with regard to a rear side section.

BACKGROUND OF THE INVENTION

A vehicle rear body structure according to conventional technologies is shown in FIG. 7 (see Japanese Unexamined Patent Application Publication No. 2002-29453). FIG. 7A is a perspective view of a joined portion between a rear wheel housing and a rear floor panel. FIG. 7B is a perspective view of a rear floor side extension. FIG. 7C is a longitudinal sectional view taken along line VIIB-VIIB of FIG. 7A.

As shown in FIG. 7, in a vehicle rear body structure disclosed in Japanese Unexamined Patent Application Publication No. 2002-29453, a rear floor side extension 1 is longitudinally and vertically enlarged and joined at its front edge 1a to a joining area of a mating flange 3 located at the rear side of a rear wheel housing outer panel 2a. Then, the rear floor side extension 1 thus mounted to the rear body side is joined breadthways to an upstanding wall 6a of the rear floor side panel 6 through a draught opening 5 (see FIG. 7C) of a rear fender panel 4 when installed to a rear floor assembly. The vehicle rear body structure disclosed in Japanese Unexamined Patent Application Publication No. 2002-29453 allows the use of an enlarged rear floor side extension without posing any problems in joining the rear floor side extension, thereby enhancing the reinforcement of the rear side section.

A joined portion A (see FIG. 7A) between a rear floor panel (rear floor side panel 6) and the rear side extension 1 is subjected to vertical, longitudinal, and lateral loads from a suspension input point (rear wheel housing 2). In addition, the joined portion A constitutes a lower end of a vehicle rear end and is located at a side end corner, greatly affecting the stiffness of the vehicle rear section.

With this in mind, in a vehicle rear body structure disclosed in Japanese Unexamined Patent Application Publication No. 2002-29453, a slanted side H on the top end of a surface portion M formed between the joined portion A and a joined portion B (joined portion between the rear floor side extension 1 and the rear wheel housing 2) does not extend to the joined portion A from the joined portion B (see FIG. 7A), and thus contributes less to the stiffness of the vehicle rear section.

Also, in a vehicle rear body structure disclosed in Japanese Unexamined Patent Application Publication No. 2002-29453, the joined portion A and a joined portion C (joined portion between the rear floor side extension 1 and a body side panel) are vertically spaced apart from each other (see FIG. 7A) with only one plate member provided between the joined portion A and the joined portion C (see FIG. 7C), and thus contribute less to the stiffness of the vehicle rear section.

Furthermore, in a vehicle rear body structure disclosed in Japanese Unexamined Patent Application Publication No. 2002-29453, the rear floor panel 7 and the rear wheel housing 2 are joined to each other with two components, including the rear floor side panel 6 and the rear floor side extension 1, therebetween. A greater number of joined portions between such two components results in a lower contribution to the stiffness of the vehicle rear section.

SUMMARY OF THE INVENTION

Accordingly, the present embodiment provides a vehicle rear body structure that can enhance the stiffness of a body rear section.

A first aspect of the embodiment provides a vehicle rear body structure which includes rear floor panels located at the rear of a body, rear wheel housings that are disposed at both breadthways outer sides of the rear floor panels, and rear side extensions that are disposed at both breadthways outer sides of the rear floor panels behind the rear wheel housings, wherein the rear side extensions each have a first joined portion that is joined to an breadthways outer end of each of the rear floor panels, a second joined portion that is joined to an rear end of each of the rear wheel housings, a side portion that is provided between the first joined portion and the second joined portion, and a surface portion surrounded by the first joined portion, the second joined portion, and the side portion and wherein the side portion is configured to have higher stiffness or strength than the surface portion.

In the embodiment, the side portion is configured to have higher stiffness or strength than the surface portion in the rear side extension. Accordingly, the side portion having higher stiffness or strength than the surface portion functions as a connecting member between the first joined portion and the second joined portion, thereby reinforcing the surrounded region of the surface portion. This configuration enhances the stiffness of, for example, the surface portion to resist tensile deformation, compressive deformation, or bending deformation, thereby allowing a load to be effectively transmitted between the rear floor panel and the rear wheel housing, which results in an enhanced stiffness of the body rear section. "Stiffness" refers to the property of the body to resist deformation caused by an external force. "Strength" refers to overall strengths including compressive strength, tensile strength, bending strength and other various strengths.

A second aspect of the embodiment provides a vehicle rear body structure wherein the side portion has a ridge portion formed of a plurality of flections in its cross section.

In the embodiment, the side portion in the rear side extension has the ridge portion formed of a plurality of flections, making the side portion highly stiff and strong with a simplified configuration.

A third aspect of the embodiment provides a vehicle rear body structure wherein a rear panel is provided at rear ends of the rear floor panels, and rear pillars are provided so as to extend upward from both breadthways ends of the rear inner panel, and the rear side extensions each have an extending portion that extends toward the rear of the body from midway along the length of the side portion and is joined to at least one of the rear panel and the rear pillar.

In the embodiment, the rear side extension is joined to at least one of the rear panel and the rear pillar with the extending portion therebetween, thereby allowing a load to be bilaterally transmitted between the rear panel or the rear pillar and the rear side extension. This arrangement prevents falling action from being exerted on the rear panel or the rear pillar in the front-rear direction of the vehicle, thereby preventing vertical vibrations from being applied to the rear panel or the rear pillar as well as the rear ends of the rear floor panels and the rear frame located below the rear pillar.

A fourth aspect of the embodiment provides a vehicle rear body structure wherein a flange portion is provided in at least one of the rear panel and the rear pillar so as to extend toward the front of the vehicle along the surface portion, and the extending portion is joined to the flange portion.

In the embodiment, the extending portion in the rear side extension is joined to the flange portion of the rear panel or the rear pillar. In this configuration, a load is applied to the joined region between the rear panel or the rear pillar and the extending portion in a direction along the surface portion of the rear side extension. Joining the extending portion to the flange portion extending along the surface portion allows the load to be received in a shear direction in relation to the application of the load, resulting in improved higher joining strength.

A fifth aspect of the embodiment provides a vehicle rear body structure wherein the extending portion is formed into a substantially triangular shape with a first side that extends upward from the vicinity of a rear end of the first joined portion and a second side that stands upward so as to extend toward the rear of the body from midway along the length of the side portion.

In the embodiment, the extending portion is formed into a substantially triangular shape with the first side and the second side. This arrangement allows a load exerted by the rear panel or the rear pillar to be transmitted in the lengthwise direction of the side portion so as to be diffused, thereby enhancing load transmission efficiency.

A sixth aspect of the embodiment provides a vehicle rear body structure wherein at least one of the first side and the second side is configured to have higher stiffness or strength than any other portion in the extending portion.

In the embodiment, the first side or the second side of the extending portion in the rear side extension is configured to have higher stiffness or strength than any other portion in the extending portion. This arrangement enhances the diffusion of a load exerted by the rear pillar, thereby further improving the load transmission efficiency.

A seventh aspect of the embodiment provides a vehicle rear body structure wherein at least one of the side portion and the first side and the second side has a ridge portion formed of a plurality of flections in its cross section.

In the embodiment, at least one of the side portion and the first side and the second side in the rear side extension has the ridge portion formed of a plurality of flections. This arrangement can make the first side and the second side of the extending portion and the side portion highly stiff or strong with a simplified configuration.

A eighth aspect of the embodiment provides a vehicle rear body structure wherein the rear wheel housings each include a rear wheel housing inner panel disposed inside of a vehicle compartment and a rear wheel housing outer panel disposed outside of the vehicle compartment, and the rear side extension is formed integrally with the rear wheel housing outer panel.

In the embodiment, the rear side extension is formed integrally with the rear wheel housing outer panel, instead of being formed separately. This arrangement reduces the number of parts and installation man-hours and eliminates the joined portion between the rear side extension and the rear wheel housing outer panel, thereby enhancing the load transmission efficiency.

A ninth aspect of the embodiment provides a vehicle rear body structure wherein the rear panel is provided so as to extend upward from a rear end of the rear floor panel, and an rear end of the first joined portion extends close to the rear panel, and the side portion extends toward the second joined portion from the end of the first joined portion.

In the embodiment, the rear end of the first joined portion in the rear side extension is provided so as to extend close to a region where the rear floor panel and the rear panel are joined to each other. This arrangement causes the side portion to extend from the rear end of the first joined portion toward the second joined portion, thereby allowing a load to be effectively transmitted on a bilateral basis between the rear floor panel or the rear panel and the rear wheel housing, which can enhance the stiffness of the body rear section.

A tenth aspect of the embodiment provides a vehicle rear body structure wherein the rear panel includes a rear inner panel disposed inside of the vehicle compartment and a rear outer panel disposed outside of the vehicle compartment, and the rear floor panel is joined to the rear inner panel, and the rear end of the rear side extension is joined to the rear outer panel.

In the embodiment, with the intervention of a joined region between the rear floor panel and the rear inner panel, a joined region between a rear end of the rear side extension and the rear outer panel is provided, which can make the first joined portion highly stiff and strong with a simplified configuration.

An eleventh aspect of the embodiment provides a vehicle rear body structure wherein a side panel that covers the vehicle compartment side of the rear wheel housing outer panel is provided, and the side panel has a side panel flange provided at the lower end thereof, which is breadthways superimposed on the first joined portion and an breadthways outer end of the rear floor panel, and the three portions, including the first joined portion, the outer end of the rear floor panel, and the side panel flange, are superimposed so as to be joined to one another.

In the embodiment, as compared to the structure according to conventional technologies disclosed in Japanese Unexamined Patent Application Publication No. 2002-29453, a joined portion between the rear floor panel and the rear side extension and a joined portion between the rear side extension and the side panel are located at the same position in the vertical direction of the vehicle, thereby allowing the joining strength to be enhanced. Also, the embodiment eliminates a surface portion between the joined portion and the joined portion, thereby further enhancing the stiffness of the body rear side section.

BRIEF DESCRIPTION OF THE DRAWINGS

The advantages of the invention will become apparent in the following description taken in conjunction with the drawings, wherein:

FIG. 5A is an end view taken along line VA-VA of FIG. 1. FIG. 5B is an enlarged longitudinal sectional view of portion VB of FIG. 5A;

FIG. 6A is a transverse, partly broken-away, sectional view taken along line VIA-VIA of FIG. 5A. FIG. 6B is an enlarged transverse sectional view of portion VIB of FIG. 6A; and FIG. 7 shows a vehicle rear body structure according to conventional technologies.

DETAILED DESCRIPTION OF THE INVENTION

Figure 1:
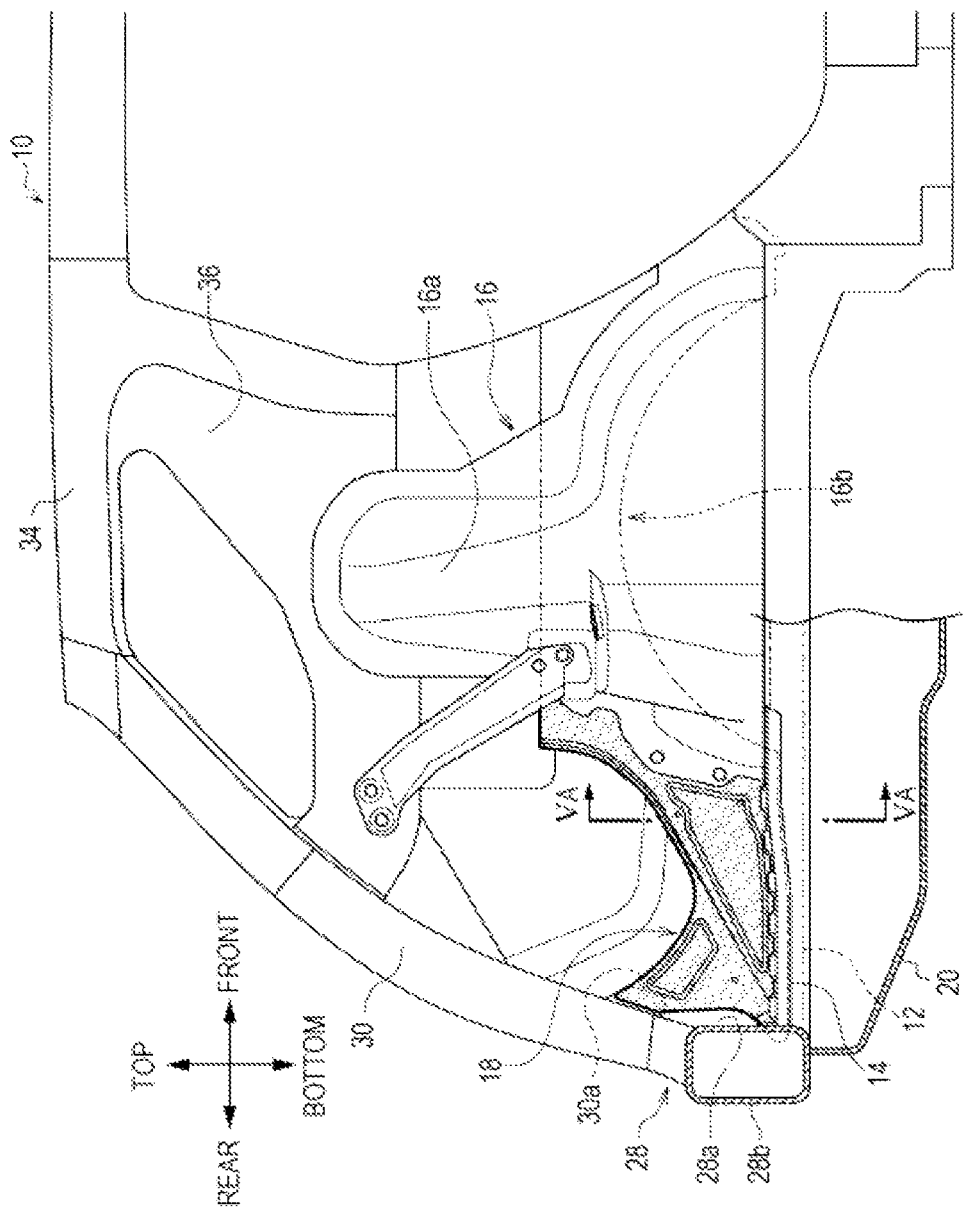
FIG. 1 is a partial side view of a vehicle rear side section having a vehicle rear body structure as seen from the inside of a vehicle compartment.
Figure 2:
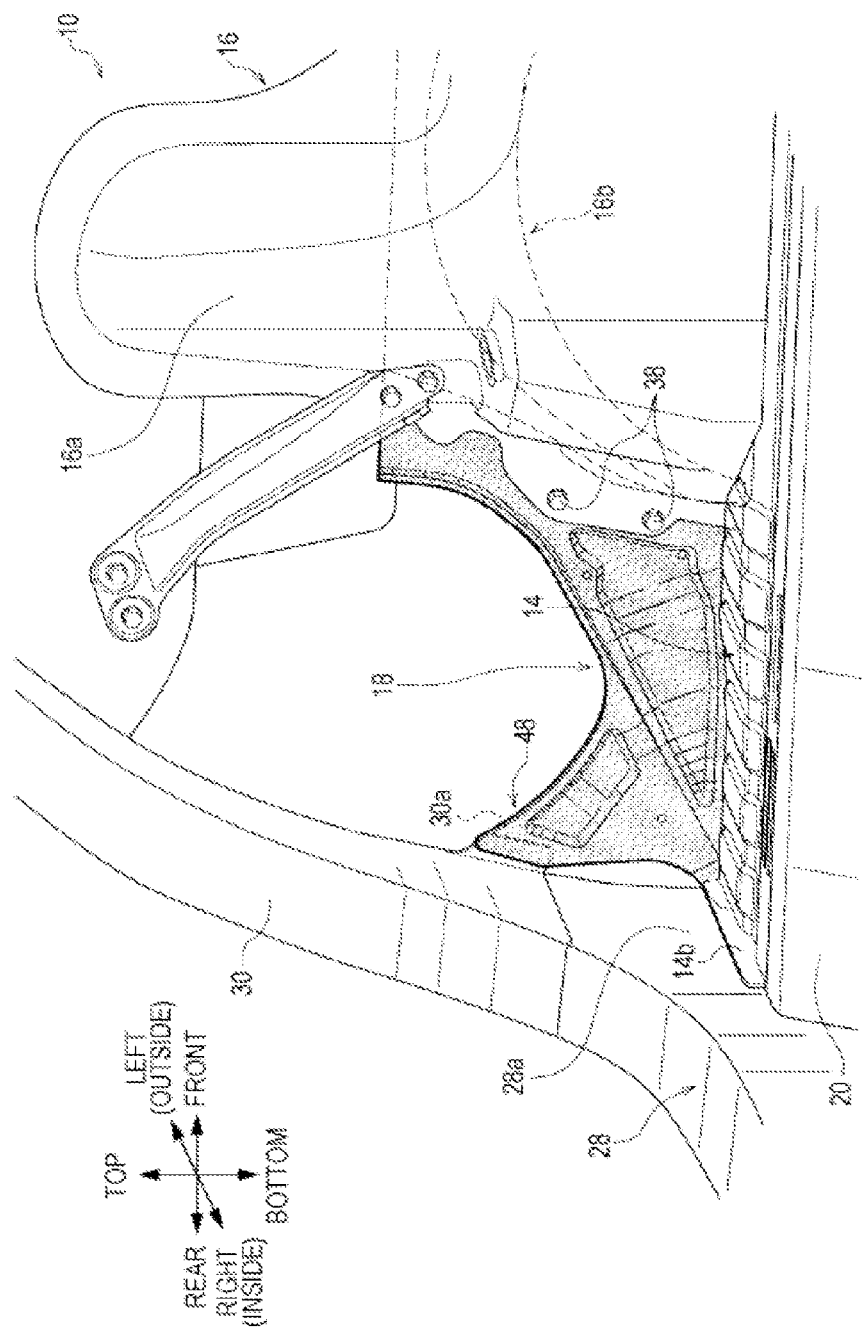
FIG. 2 is an enlarged, partly broken, side view of the vehicle rear side section of FIG. 1, as seen obliquely.

A present embodiment is described below with reference to the attached drawings. FIG. 1 is a partial side view of a vehicle rear side section having a vehicle rear body structure according to an embodiment, as seen from the inside of a vehicle compartment. FIG. 2 is an enlarged, partly broken side view of the vehicle rear side section of FIG. 1, as seen obliquely. References to top, bottom, front, and rear in the description that follows are relative to those shown in FIGS. 1 and 2.

As shown in FIG. 1, a vehicle (not illustrated) has rear frames 12 that are disposed at the rear of a body 10 so as to be breadthways (or laterally) spaced apart from each other at a predetermined distance and extend substantially in parallel to each other in the front-rear direction of the body 10, rear floor panels 14 that are disposed at both rear sides of the body 10 so as to be mounted on the rear frames 12, and rear wheel housings 16 that are disposed at both breadthways sides of the rear floor panels 14.

Also, the vehicle (not illustrated) has rear side extensions 18 (indicated by the shaded areas in FIGS. 1 and 2) that are disposed at both breadthways sides of the rear floor panels 14 so as to be located behind the rear wheel housings 16, a floor pan 20 that is disposed between one and the other of the breadthways-disposed rear floor panels 14 so as to be joined to the sides of the rear floor panels 14 and has a recessed portion (see FIG. 5A to be described later) projecting downward, and a rear panel 28 that is disposed at the rear end of the body 10 so as to be joined to the rear ends of the rear floor panels 14 and the floor pan 20.

In this embodiment, "joining" refers to bonding a plurality of members in an integral and rigid manner by spot welding, laser welding, friction stir welding or the like. Although the floor pan 20 is disposed between the pair of rear floor panels 14 spaced apart from each other breadthways in this embodiment, the rear floor panels 14 need not to be spaced apart. In other words, the rear floor panels 14 and the floor pan 20 may be formed in an integral manner.

Figure 3:
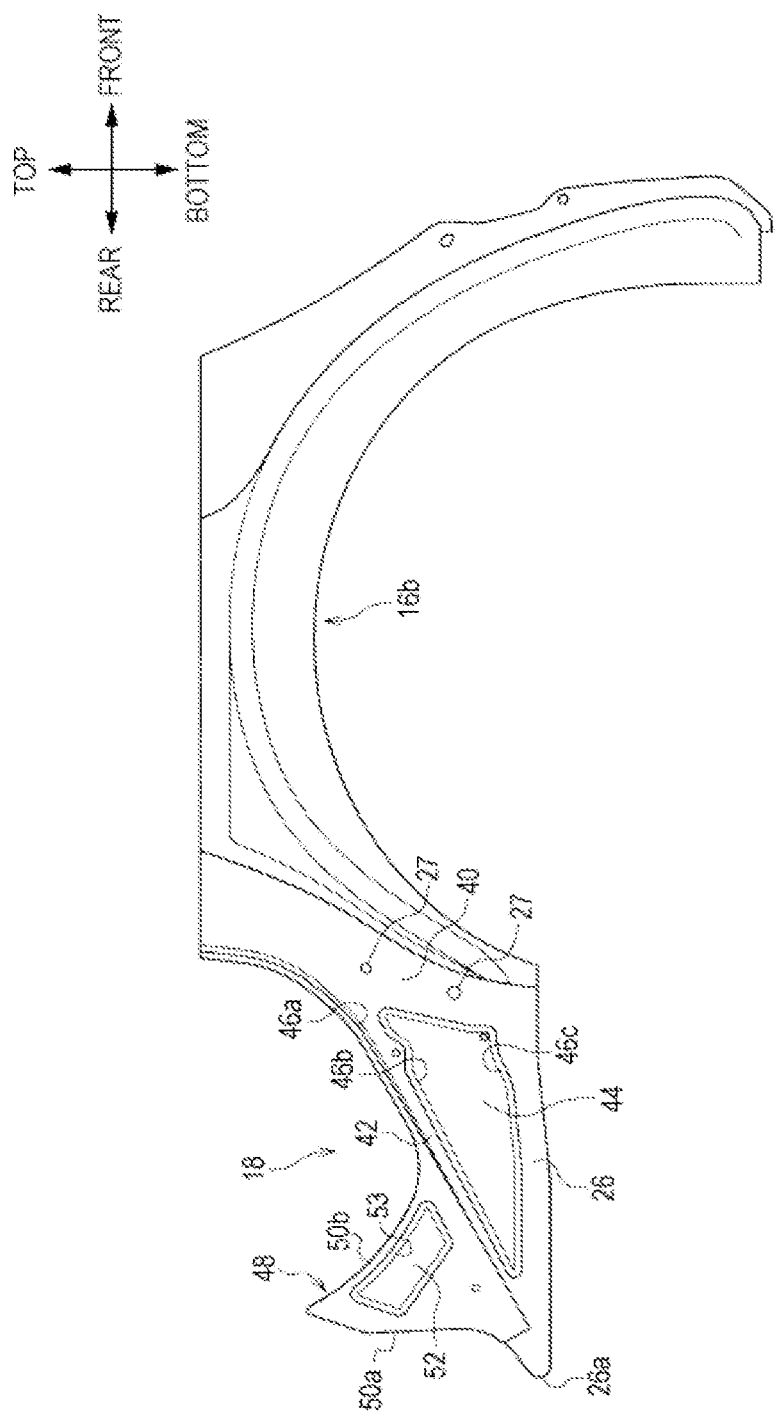
FIG. 3 is a plan view of a rear side extension formed integrally with a rear wheel housing outer panel.

Each of the rear wheel housings 16 includes a rear wheel housing inner panel 16a that is disposed inside of the vehicle compartment and a rear wheel housing outer panel 16b that is disposed outside of the vehicle compartment. In this case, each of the rear side extensions 18 is formed integrally with the rear wheel housing outer panel 16b, as shown in FIG. 3 to be described later.

A side panel 24 (see FIG. 5A to be described later) that is formed so as to cover the vehicle compartment side of the rear wheel housing outer panel 16b is provided on the outer side of the rear side extension 18. As described later, a side panel flange 24a (see FIG. 5B to be described later) that is breadthways superimposed on a first joined portion 26 of the rear side extension 18 and a breadthways outer end 14a of the rear floor panel 14 is provided at the lower end of the side panel 24.

As shown in FIG. 2, a rear panel 28 is provided at rear ends 14b of the rear floor panels 14 so as to stand upward. The rear panel 28 includes a rear inner panel 28a that is disposed inside of the vehicle compartment and a rear outer panel 28b that is disposed outside of the vehicle compartment (see FIG. 1 and FIG. 6B to be described later).

Rear pillars (D pillars) 30 are provided so as to extend upward from both breadthways ends of the rear inner panel 28a. As described later, each of the rear pillars 30 has a flange portion 30a formed at a lower end thereof which is joined to an extending portion 48 of the rear side extension 18 (see FIG. 2). As shown in FIG. 1, an upper end of the rear pillar 30 is joined to a roof side member 34, to which another rear pillar (C pillar) 36 formed wider than the rear pillar 30 is joined in front of the rear pillar 30.

Figure 4A:
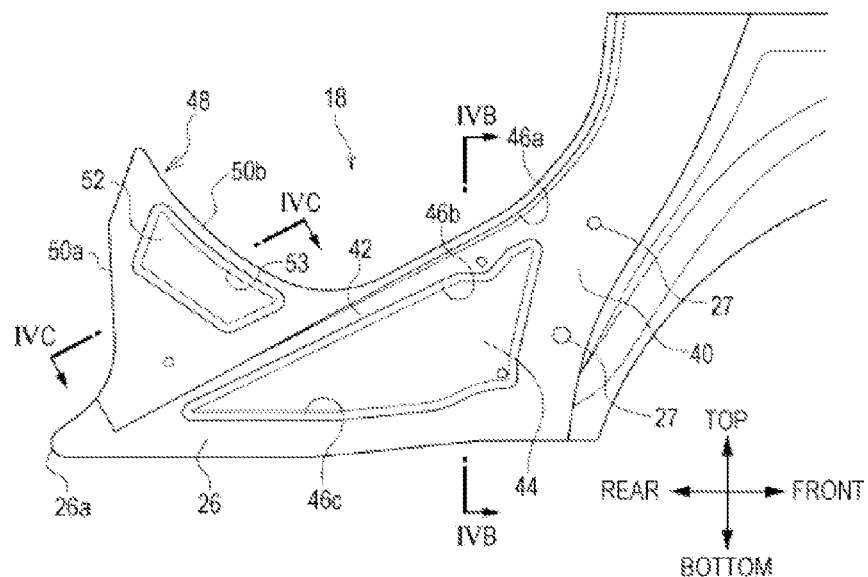
FIG. 4A is an enlarged plan view of a rear side extension.
Figure 4B:
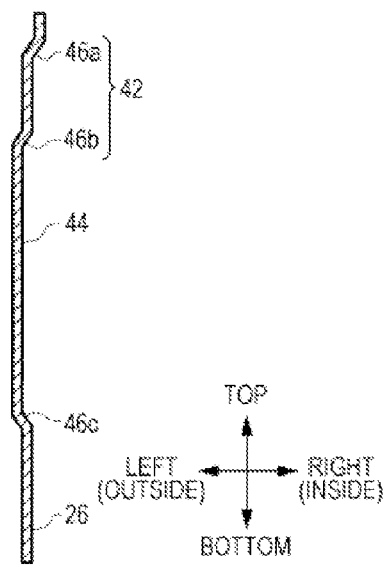
FIG. 4B is a longitudinal sectional view taken along line IVB-IVB of FIG. 4A.
Figure 4C:
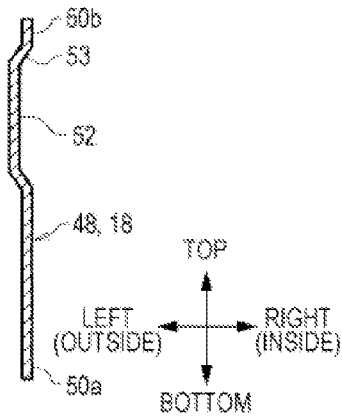
FIG. 4C is a longitudinal sectional view taken along line IVC-IVC of FIG. 4A.
Figure 7A:
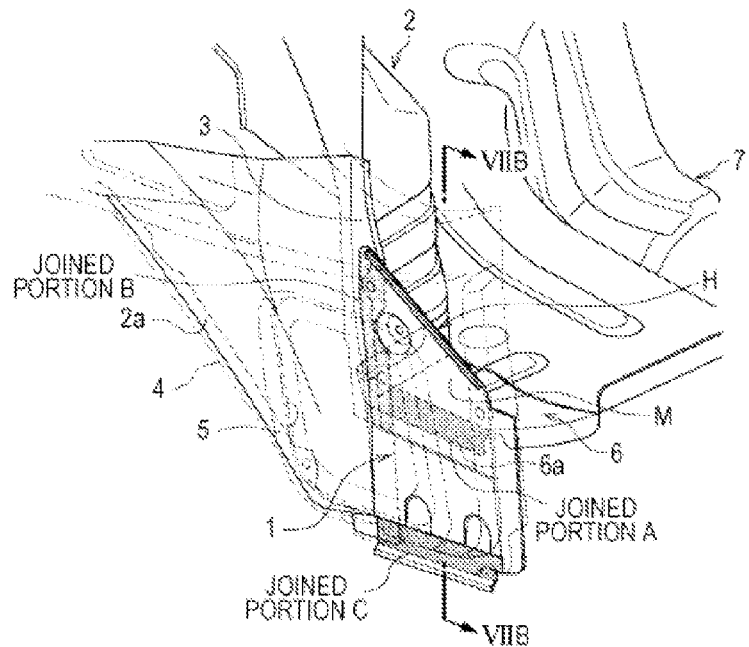
FIG. 7A is a perspective view of a joined portion between a rear wheel housing and a rear floor panel.
Figure 7B:
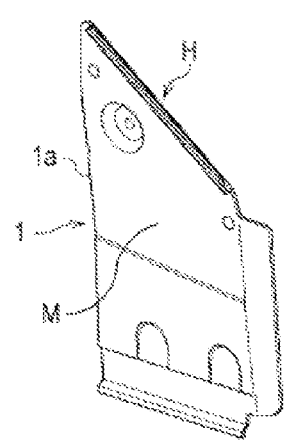
FIG. 7B is a perspective view of a rear floor side extension.
Figure 7C:
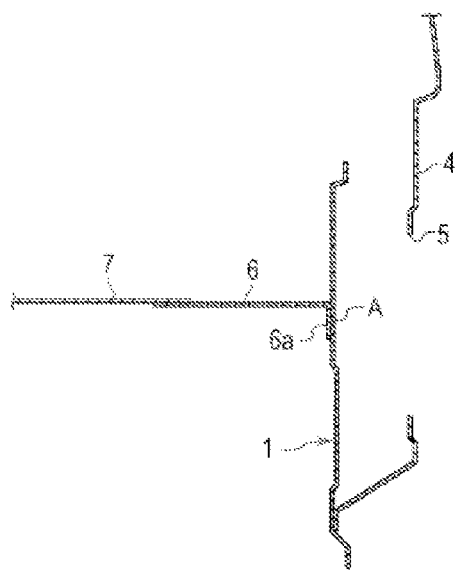
FIG. 7C is a longitudinal sectional view taken along line VIIB-VIIB of FIG. 7A.

FIG. 3 is a plan view of the rear side extension formed integrally with the rear wheel housing outer panel. FIG. 4A is an enlarged plan view of the rear side extension. FIG. 4B is a longitudinal sectional view taken along line IVB-IVB of FIG. 4A. FIG. 4C is a longitudinal sectional view taken along line IVC-IVC of FIG. 4A. FIG. 5A is an end view taken along line VA-VA of FIG. 1. FIG. 5B is an enlarged longitudinal sectional view of portion VB of FIG. 5A. FIG. 6A is a transverse, partly broken-away, sectional view taken along line VIA-VIA of FIG. 5A. FIG. 6B is an enlarged transverse sectional view of portion VIB of FIG. 6A.

As shown in FIG. 3, the rear side extension 18 is formed integrally with the rear wheel housing outer panel 16b and is provided at the rear of the rear wheel housing outer panel 16b along the front-rear direction of the vehicle. As shown in FIG. 4A, the rear side extension 18 has the first joined portion 26 that is formed of a base extending along the front-rear direction of the vehicle and is joined to the breadthways outer end 14a of the rear floor panel 14 and a second joined portion 40 that has a plurality of bolt mounting holes 27 and joined to a rear flat section of the rear wheel housing inner panel 16a through two bolts (see FIG. 2).

The outer end 14a of the rear floor panel 14 joined to the first joined portion 26 of the rear side extension 18 is formed so as to be bent and extend downward from the body 10 (see FIG. 5B). In this case, the first joined portion 26 of the rear side extension 18, the outer end 14a of the rear floor panel 14, and the side panel flange 24a located at the lower end of the side panel 24 are superimposed so as to be joined to one another in an integral manner, as shown in FIG. 5.

The rear side extension 18 has a side portion 42 formed of a slanted portion that is provided between the first joined portion 26 and the second joined portion 40 and extends so as to rise upward from the rear end of the first joined portion 26 toward the second joined portion 40 and a surface portion 44 formed of a substantially triangle-shaped recess that is surrounded by the first joined portion 26, the second joined portion 40, and the side portion 42.

In this case, the side portion 42 has a first ridge portion 46a and a second ridge portion 46b that are formed of a plurality of flections, as shown in FIG. 4B, and is configured to have higher stiffness or strength than at least the surface portion 44, which is to be detailed later. "Stiffness" refers to the property of the body to resist deformation caused by an external force. "Strength" refers to overall strength including compressive strength, tensile strength, bending strength and other various types of strength.

As shown in FIG. 4B, a third ridge portion 46c is formed of a plurality of flections in the vicinity of the first joined portion 26, and the surface portion 44 is formed of a recessed portion between the second ridge portion 46b and the third ridge portion 46c in the side portion 42.

The extending portion 48 extends or projects toward the rear of the body 10 from midway (substantially middle portion of) along the length of the side portion 42 and is joined to the flange portion 30a of the rear pillar 30. Although the flange portion 30a is typically provided in the rear pillar 30 in this embodiment, the extending portion 48 may be joined to a flange portion (not illustrated) provided in, for example, the rear panel 28 (rear inner panel 28a).

The extending portion 48 has a first side 50a that extends upward from the vicinity of a rear end 26a of the first joined portion 26 and a second side 50b that stands upward so as to extend toward the rear of the body 10 from midway along the length of the side portion 42. The extending portion 48 is surrounded by the first side 50a, the second side 50b, and the side portion 42 so as to be formed into a substantially triangular shape.

At least one of the first side 50a and the second side 50b is configured to have higher stiffness or strength than any other portion in the extending portion 48. In this embodiment, examples include a recessed portion 52 that is formed into a substantially trapezoidal shape, when viewed in plane, in the vicinity of the second side 50b in the extending portion 48. A plurality of flections that constitute the recessed portion 52 form a ridge portion 53 (see FIG. 4C). The ridge portion 53 causes the second side 50b to have higher stiffness or strength than any other portion, including the first side 50a, in the extending portion 48.

Next, the joining relationship between the rear side extension 18 and the other members is outlined below.

The first joined portion 26 is joined to the breadthways outer end 14a of the rear floor panel 14. The second joined portion 40 is joined to a rear flat section of the rear wheel housing inner panel 16a through the two bolts 38. The extending portion 48 is joined to the flange portion 30a of the rear pillar 30.

With the arrangement described above, the body 10 having the vehicle rear body structure according to this embodiment provides the following advantageous effects.

In this embodiment, the side portion 42 is configured to have higher stiffness or strength than the surface portion 44 in the rear side extension 18. Accordingly, the side portion 42 having higher stiffness or strength than the surface portion 44 functions as a connecting member between the first joined portion 26 and the second joined portion 40, thereby reinforcing the surrounded region of the surface portion 44. This configuration enhances the stiffness of, for example, the surface portion 44 to resist tensile deformation, compressive deformation, or bending deformation, thereby allowing a load to be effectively transmitted between the rear floor panel 14 and the rear wheel housing 16, which results in enhanced stiffness of the body rear section.

In addition, the side portion 42 in the rear side extension 18 has the first ridge portion 46a and the second ridge portion 46b that are formed of a plurality of flections (see FIG. 4B) in this embodiment, making the side portion 42 highly stiff and strong with such a simplified configuration. The ridge portions may include at least one ridge portion.

Furthermore, the side portion 42 in the rear side extension 18 is joined to the rear pillar 30 with the extending portion 48 therebetween in this embodiment (see FIG. 2), thereby allowing a load to be bilaterally transmitted between the rear pillar 30 and the rear side extension 18. This arrangement prevents falling action from being exerted on the rear pillar 30 in the front-rear direction of the vehicle, thereby preventing vertical vibrations from being applied to the rear pillar 30 as well as the rear ends of the rear floor panel 14 and the rear frame 12 located below the rear pillar 30.

Also, the extending portion 48 in the rear side extension 18 is joined to the flange portion 30a of the rear pillar 30 in this embodiment (see FIG. 2). In this configuration, a load is applied to the joined region between the extending portion 48 and the rear pillar 30 in a direction along the surface portion 44 of the rear side extension 18. Joining the extending portion 48 to the flange portion 30a extending along the surface portion 44 allows the load to be received in a shear direction in relation to the application of the load, resulting in improved higher joining strength.

Also, the extending portion 48 is formed into a substantially triangular shape with the first side 50a and the second side 50b in this embodiment (see FIG. 4A). This arrangement allows a load exerted by the rear pillar 30 to be transmitted in the lengthwise direction of the side portion 42 so as to be diffused, thereby enhancing load transmission efficiency.

Also, the second side 50b of the extending portion 48 in the rear side extension 18 is configured to have higher stiffness or strength than any other portion in the extending portion 48 in this embodiment. This arrangement enhances the diffusion of a load exerted by the rear pillar 30, thereby further improving the load transmission efficiency.

Also, the second side 50b of the extending portion 48 in the rear side extension 18 has the ridge portion 53 formed of a plurality of flections in this embodiment (see FIG. 4C). This arrangement can make the first side 50a and the second side 50b of the extending portion 48 and the side portion 42 be highly stiff or strong with a simplified configuration.

Furthermore, the rear side extension 18 is formed integrally with the rear wheel housing outer panel 16b, instead of being formed separately, in this embodiment (see FIG. 4C). This arrangement reduces the number of parts and installation man-hours and eliminates the joined portion between the rear side extension 18 and the rear wheel housing outer panel 16b, thereby enhancing the load transmission efficiency.

Assuming that the rear side extension 18 is formed integrally with the rear wheel housing inner panel 16a, the counterpart to which the side panel 24 is joined is the rear wheel housing outer panel 16b in the wheel arch region and the rear wheel housing inner panel 16a in a section extending into the first joined portion 26. Variations in the counterpart to which the side panel 24 is joined may cause problems of reduced joining accuracy of the side panel 24 and degraded appearance. These problems, however, can be solved by forming the rear side extension 18 integrally with the rear wheel housing outer panel 16b, as described in this embodiment.

Also, the rear end 26a of the first joined portion 26 in the rear side extension 18 is provided so as to extend close to a region where the rear floor panel 14 and the rear panel 28 are joined to each other in this embodiment (see FIG. 6). This arrangement causes the side portion 42 to extend from the rear end 26a of the first joined portion 26 toward the second joined portion 40 in this embodiment, thereby allowing a load to be effectively transmitted on a bilateral basis between the rear floor panel 14 or the rear panel 28 and the rear wheel housing 16, which can enhance the stiffness of the body rear section.

Also, as shown in FIG. 6B, with the intervention of a joined region 60 between the rear end 14b of the rear floor panel 14 and the rear inner panel 28a, a joined region 62 between the rear end 26a of the first joined portion 26 in the rear side extension 18 and the rear outer panel 28b is provided, which can make the first joined portion 26 highly stiff and strong with a simplified configuration.

Furthermore, as compared to the structure according to conventional technologies, a joined portion between the rear floor panel and the rear side extension and a joined portion between the rear side extension and the side panel are located at the same position in the vertical direction of the vehicle in this embodiment, as shown in FIG. 5, thereby allowing the joining strength to be enhanced. Unlike conventional technologies, this embodiment eliminates a surface portion between the joined portion and the joined portion. Instead, three members, including the rear floor panel 14, the rear side extension 18, and the rear side extension 18, are superimposed and joined in an integral manner (see FIG. 5B), thereby enhancing the stiffness of the body rear side section.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A vehicle rear body structure comprising:
    rear floor panels located at the rear of a body;
    rear wheel housings that are disposed at both breadthways outer sides of the rear floor panels; and
    rear side extensions that are disposed at both breadthways outer sides of the rear floor panels behind the rear wheel housings,
    wherein the rear side extensions each have a first joined portion that is joined to a breadthways outer end of each of the rear floor panels, a second joined portion that is joined to a rear end of each of the rear wheel housings, a side portion that is provided between the first joined portion and the second joined portion, and a surface portion surrounded by the first joined portion, the second joined portion, and the side portion, and wherein the side portion is configured to have higher stiffness or strength than at least the surface portion,
    wherein a rear panel is provided at rear ends of the rear floor panels, and rear pillars are provided so as to extend upward from both breadthways ends of the rear panel,
    wherein the rear side extensions each have an extending portion that extends toward the rear of the body from midway along the length of the side portion and that is joined to at least one of the rear panel and the rear pillar, and
    wherein the extending portion is formed into a substantially triangular shape with a first side that extends upward from the vicinity of a rear end of the first joined portion and a second side that stands upward so as to extend toward the rear of the body from midway along the length of the side portion.

2. The vehicle rear body structure according to claim 1, wherein the side portion has a ridge portion, the ridge portion being formed of a plurality of flections, when viewed in cross section.

3. The vehicle rear body structure according to claim 1, wherein a flange portion is provided in at least one of the rear panel and the rear pillar so as to extend toward the front of the vehicle along the surface portion of the extending portion, and
    wherein the extending portion is joined to the flange portion.

4. The vehicle rear body structure according to claim 1, wherein at least one of the first side and the second side is configured to have higher stiffness or strength than any other portion of the extending portion.

5. The vehicle rear body structure according to claim 1, wherein at least one of the side portion, the first side of the extending portion, and the second side of the extending portion has a ridge portion formed of a plurality of flections in its cross section.

6. The vehicle rear body structure according to claim 1, wherein the rear wheel housings each include a rear wheel housing inner panel disposed inside of a vehicle compartment and a rear wheel housing outer panel disposed outside of the vehicle compartment, and wherein the rear side extension is formed integrally with the rear wheel housing outer panel.

7. The vehicle rear body structure according to claim 1, wherein the rear panel is provided so as to extend upward from a rear end of the rear floor panel,
    wherein a rear end of the first joined portion extends towards the rear panel, and
    wherein the side portion extends toward the second joined portion from the end of the first joined portion.

8. The vehicle rear body structure according to claim 7, wherein the rear panel includes a rear inner panel disposed inside of the vehicle compartment and a rear outer panel disposed outside of the vehicle compartment,
    wherein the rear floor panel is joined to the rear inner panel, and wherein the rear end of the rear side extension is joined to the rear outer panel.

9. The vehicle rear body structure according to claim 1, wherein a side panel that covers the vehicle compartment side of the rear wheel housing outer panel is provided,
    wherein the side panel has a side panel flange provided at the lower end thereof which is breadthways superimposed on the first joined portion and a breadthways outer end of the rear floor panel, and
    wherein the first joined portion, the outer end of the rear floor panel, and the side panel flange are superimposed so as to be joined to one another.

\* \* \* \* \*